June 17, 1969
C. F. BACHLE
3,450,112
VARIABLE COMPRESSION RATIO PISTON INCLUDING SURGE
ACCUMULATION MEANS
Filed Nov. 13, 1967
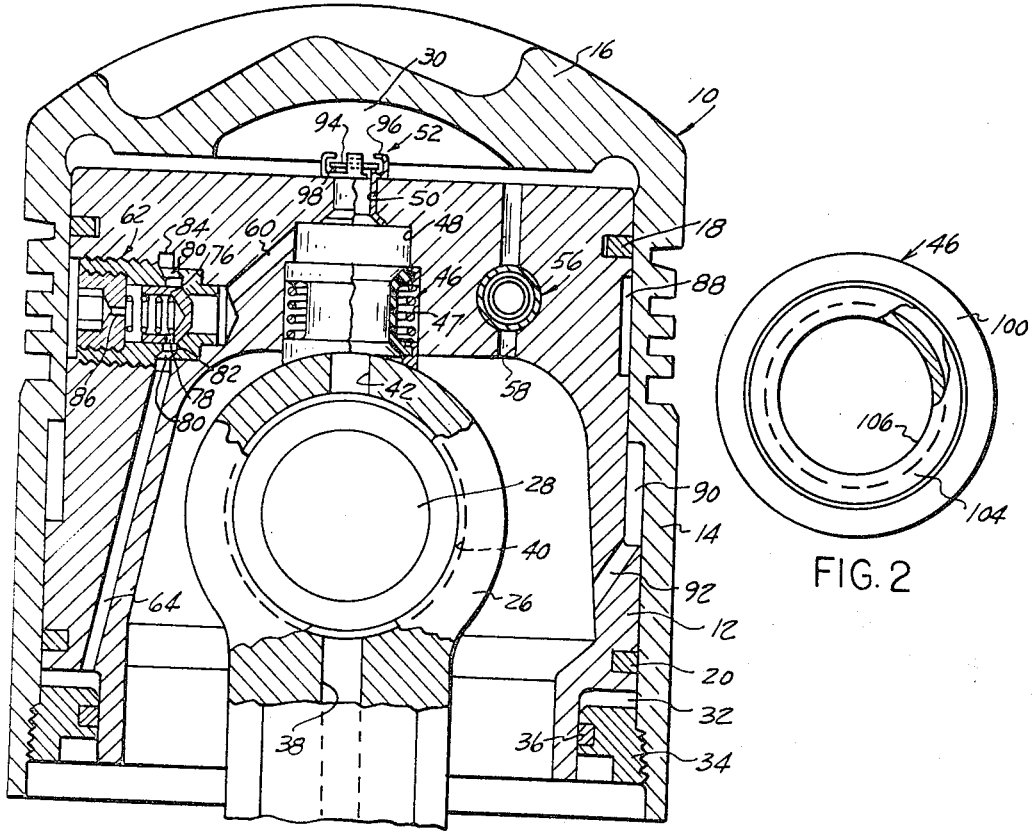
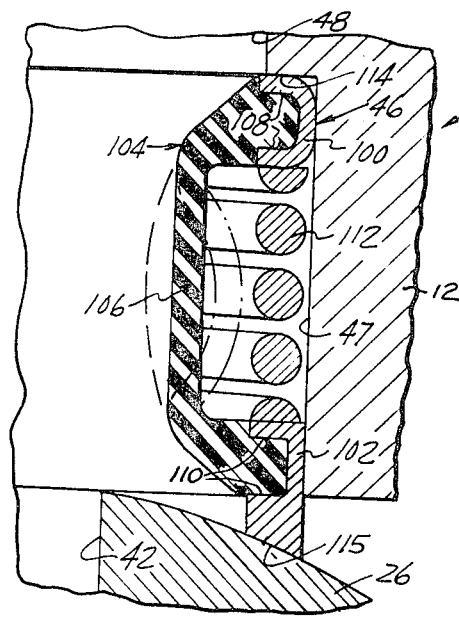
INVENTOR.
CARL F. BACHLE
BY
Hauke, Knass, & Gifford
ATTORNEYS United States Patent Office 3,450,112
Patented June 17, 1969

3,450,112
VARIABLE COMPRESSION RATIO PISTON INCLUDING SURGE ACCUMULATION MEANS
Carl F. Bachle, Grosse Pointe, Mich., assignor to Continental Aviation and Engineering Corporation, Detroit, Mich., a corporation of Virginia
Filed Nov. 13, 1967, Ser. No. 682,273
Int. Cl. F02b 75/04
U.S. Cl. 123—78                    9 Claims

ABSTRACT OF THE DISCLOSURE

A two-part variable compression ratio piston assembly having an outer member movable relative to an inner member to vary the compression ratio of an internal combustion engine and a hydraulic system for automatically controlling relative movement of the members to maintain a predetermined maximum combustion chamber pressure. The hydraulic circuit includes an upper and a lower chamber which expand and contract conversely upon relative movement of the piston members and a system for supplying and discharging an incompressible fluid from these chambers in a manner which gradually increases the compression ratio of the engine until a predetermined maximum combustion chamber pressure has been achieved and which tends to maintain the maximum combustion chamber pressure after it has been achieved. The fluid preferably comprises oil from the lubrication system of the engine supplied to the piston through the connecting rod and the hydraulic circuit also includes a novel construction for the slipper collector assembly commonly utilized in these constructions to make the connection between the passages in the inner member of the piston and a passage connected with the lubrication supply source through the connecting rod. The slipper collector assembly of the present disclosure includes a resilient member which acts to dampen pulsations in the hydraulic system and to accumulate surges to thereby smooth the oil flow to the chambers.

BACKGROUND OF THE INVENTION

The present invention relates to variable compression ratio (VCR) piston assemblies such as those disclosed in prior U.S. Patents Nos. 3,156,162; 3,161,112; 3,185,137; 3,185,138; 3,303,831 and 3,311,096. In the disclosures of these patents an inner piston member or carrier is connected in the usual manner to a connecting rod and an outer piston member or shell is carried by and is movable axially relative to the inner member. Relative movement of these members varies the compression ratio of the particular cylinder in which the piston moves. Clearance spaces are provided between the top and bottom ends of the inner and outer members and these form upper and lower chambers which vary conversely in volume in relation to the relative movement of the members. An incompressible fluid such as lubrication oil is supplied to these chambers in a manner which automatically regulates movement of the members to gradually increase the compression ratio until a predetermined combustion chamber pressure has been achieved. The hydraulic system then varies the movement of the members in a manner which tends to maintain a uniform maximum combustion chamber pressure.

In the constructions disclosed in these patents the upper chamber is substantially larger in volume than the lower chamber so that upon expansion of the upper chamber there is a tendency for pressure surges to be produced within the system supplying the upper chamber. Such pressure surges as well as other pulsations normally occurring in hydraulic systems and which have other causes sometimes result in vibration of the parts and erratic action of the piston.

SUMMARY OF THE INVENTION

The presnt invention provides a new construction for the slipper collector assembly provided for pistons constructed in accordance with the disclosures of the aforementioned patents. The slipper collector assembly is carried in the inner member and engages the connecting rod to direct oil from a passage provided in the connecting rod to the supply valve assemblies for the upper and lower chambers.

The slipper collector assembly of the present invention includes an elastic portion which expands and contracts when fluid pulsations are transmitted through the oil in the connecting rod to the upper chamber. The elastic portion expands upon pulsations or surges being produced and returns to its original shape or even contracts to provide a counter force for offsetting the pulsations and for smoothing the flow of the oil from the connecting rod to the chambers.

DESCRIPTION OF THE DRAWINGS

A preferred embodiment of the present invention is described more fully in the following description which refers to the accompanying drawings in which like reference characters refer to like parts throughout the several views and in which;

FIG. 1 is a longitudinal cross-sectional view of a piston assembly embodying the construction of the present invention;

FIG. 2 is an enlarged plan view of a portion of the structure illustrated in FIG. 1;

FIG. 3 is an enlarged fragmentary cross-sectional view of a portion of the structure illustrated in FIG. 1.

DESCRIPTION OF A PREFERRED EMBODIMENT

Now referring to the drawings for a more detailed description of the present invention, a preferred variable compression ratio (VCR) piston 10 is therein illustrated as comprising an inner member or piston pin carrier 12 carrying on its outer surface an outer member or shell 14. The outer member 14 has a crown 16 which serves as the head of the piston 10 and which forms a movable wall of the lower boundary of the combustion chamber of the engine. Inner member 12 is axially slidable within and with respect to the outer member 14 and is provided with rings 18 and 20 which engage the inner surface of the outer member 14 and provide a fluid tight seal between these surfaces. Inner member 12 is linked to the crankshaft (not shown) of the engine by a connecting rod 26 and a wrist pin 28 in the conventional manner.

Thus the inner member 12 is movable axially between fixed upper and lower limits in the manner of a conventional piston while the outer member 14 can move axially upwardly and downwardly relative to the inner member 12 within limits which will be presently described. An upper variable volume chamber 30 is formed intermediate the upper surface of the inner member 12 and the lower surface of the crown 16. A lower variable volume chamber 32 is formed intermediate the lower surface formed by an annular recess at the lower end of the inner member 12 and by the upper surface of a ring 34 fixed to the outer member 14. A sealing ring 36 prevents fluid leakage from the lower chamber 32 intermediate the adjacent surfaces of the inner member 12 and the ring 34.

The ring 34 and the lower surface of the crown 16 defining the upper chamber 30 provides the limits of axial movement of the outer member 14 relative to the inner member 12. This relative movement provides a variable height from the center of the wrist pin 28 to the top of the piston crown 16 to thereby vary the compression ratio of the engine by varying the clearance volume of the combustion chamber. This movement of the outer member 14 relative to the inner member 12 is automatically controlled by regulating the flow of an incompressible fluid into and out of the chambers 30 and 32. The control fluid preferably comprises oil supplied to the piston 10 from the usual pressurized lubricating oil supply of the engine by an oil passage 38 in the connecting rod 26. The passage 38 preferably connects with an annular groove 40 encircling the piston pin 28 and leading to an outlet 42. A slipper collector assembly generally indicated at 46 and which will be described in greater detail below is disposed in a cavity 47 formed in the inner member 12 and collects the oil discharging from outlet 42 and directs it to a cavity 48 formed in the inner member 12.

Oil is fed from cavity 48 to upper chamber 30 by an axial passage 50 and through a one-way check valve assembly 52 disposed within the passage 50. Oil is discharged from upper chamber 30 under the control of a pressure regulating discharge valve assembly 56 which opens to release oil through a drainage passage 58 when oil pressure in chamber 30 exceeds a predetermined value.

Oil is fed from cavity 48 to the lower chamber 32 by way of an angular passage 60 which communicates with a combination inlet and discharge valve assembly 62. The valve assembly 62 controls the supply of oil to and from a combination supply and discharge passage 64 running downwardly in inner member 12 from the valve assembly 62 to the lower chamber 32.

The particular supply circuit to the lower chamber 32 illustrated herein is the subject of U.S. Patent No. 3,156,162 referred to above and assigned to the assignee of the present invention. When the volume of chamber 32 is increased by a downward movement of the outer member 14 relative to the inner member 12, a spring-biased valve member 76 opens in response to the pressure differential between cavity 48 and lower chamber 32 and permits oil to flow via passages 60 and 64 to lower chamber 32. When the outer piston member 14 moves upwardly relative to the inner member 12 the resulting reversal of pressure closes valve member 76 and oil flows from the chamber 32 via passage 64 to a port 78 in valve member 76 which leads to the hollow interior thereof, port 78 being open at all times to the passage 64 with the valve member 76 in the closed position by means of connecting passages 80 and chambers 82 and 84.

The oil then flows at a predetermined restricted rate from the spring chamber behind the valve member 76 via a restricted orifice 86 calculated to provide the necessary flow restriction to an annular cooling groove 88 formed at the outer surface of the inner member 12. The oil then leaks downwardly to the crankcase of the engine via another annular space 90 between the outer and inner members and a drain passage 92. Valve assembly 62 is designed then to permit rapid downward movement of the outer member 14 relative to the inner member 12 but controls movement in the opposite direction so that it causes movement in small increments over several cycles.

The supply of oil from cavity 48 to the upper chamber 30 is controlled by the one-way check valve assembly 52 which includes a plate 94 operable to be moved upwardly against stop portions 96 upon pressure being built up in cavity 48 and to move downwardly against a valve seat portion 98 to close fluid flow from cavity 48 to the chamber 30 when the pressure in chamber 30 exceeds that in the cavity 48.

As can best be seen in FIGS. 2 and 3 the slipper collector assembly 46 includes upper and lower ring members 100 and 102 respectively preferably each constructed of a metallic material such as bronze or the like. An elastic member 104 having a cylindrical medial portion 106 of a diameter less than that of the ring members 100 and 102 is clamped along its upper and lower edges to the ring members 100 and 102 by means of inturned flange portions 108 and 110 of the ring members 100 and 102 respectively. A spring member 112 seats between radial opposing portions of the ring members 100 and 102 and urges the upper ring member 100 against an appropriate seat 114 formed at the juncture of the cavities 47 and 48 and urges the lower ring member 102 into a position in which a complementarily formed face portion 115 slidingly sealingly engages the upper contour of the connecting rod 26.

The spring 112 is radially outwardly spaced from and encompasses the medial portion 106 of the elastic member 104 so that the elastic member 104 is free to expand and contract between the positions illustrated in dashed lines in FIG. 3.

OPERATION

Assuming that the combustion chamber pressure is below a predetermined maximum value which the VCR piston 10 is designed to maintain and that the upper and lower chambers 30 and 32 are both filled with oil, as the piston member 10 decelerates upon approaching top dead center position at the end of the exhaust stroke and accelerates in the opposite direction on the intake stroke, the momentum of outer member 14 tends to force it upwardly relative to the inner member 12, thereby raising the oil pressure in lower chamber 32 above that existing in the cavity 48 and passage 60.

The oil pressure in lower chamber 32 is transmitted via the column of oil in passage 64 to the body of oil contained in the interior of the valve member 76. Thus as the ring 34 is forced upwardly because of outer member 14 momentum, oil pressure behind the valve member 76 builds up and fluid pressure plus the spring forces move the valve member 76 to a closed position. Thereafter as lower chamber pressure increases a predetermined amount of oil is forced out of chamber 32 via passage 64 through the passage 80 and chambers 82 and 84 to the interior of the valve member 76 and then through restricted orifice 86 to the cooling groove 88 from which it leaks as previously described.

The controlled leakage of a predetermined amount of oil from the lower chamber 32 permits outer member 14 to move a very small distance upwardly relative to inner member 12. This in turn increases the volume of and consequently reduces fluid pressure in upper chamber 30. When the oil pressure in cavity 48 exceeds that in upper chamber 30, valve assembly 52 opens to admit oil from the cavity 48 to the upper chamber 30. This added oil is trapped in the chamber 30 when the valve assembly 52 closes due to the pressure reversal caused by the reversal of momentum forces as piston 10 approaches and passes through the bottom dead center position at the end of the intake stroke and at the beginning of the compression stroke. This prevents outer member 14 from moving back downwardly relative to inner member 12 until such time as the oil pressure in the chamber 30 exceeds the predetermined pressure at which the pressure regulating valve assembly 56 is set to open.

Hence upward movement of outer member 14 relative to inner member 12 may occur for several cycles terminating when cylinder clearance volume has been reduced to the point where combustion chamber pressure reaches a predetermined maximum value which produces the valve opening pressure in chamber 30. Thereafter a state of relative equilibrium exists wherein the outer member 14 moves up and down very slightly relative to the inner member 12 in each cycle, its mean relative position being that producing the maximum combustion chamber pressure as predetermined by the setting of the valve assembly 56.

If the combustion chamber pressure is suddenly increased as by opening the engine throttle or by increasing the load on the engine, valve assembly 56 is designed to rapidly discharge oil from the upper chamber 30 so that the outer member 14 can move rapidly downwardly relative to inner member 12 thereby increasing the cylinder clearance volume and thus reducing combustion chamber pressure to the desired maximum value within a relatively few cycles of piston 10. Valve assembly 56 is designed to permit this downward relative movement of outer member 14 more rapidly than restricted orifice 86 permits upward movement in each cycle. This insures rapid relief of excessive combustion chamber pressure and limits oil pumping losses since the outer member 14 must gradually creep back up to regain its original position relative to the inner member 12 as compared to its more rapid pressure relieving movement.

The downward movement of outer member 14 relative to inner member 12 increases the volume of lower chamber 32 causing the oil pressure therein to drop. As the pressure in lower chamber 32 drops valve member 76 is forced open by pressure oil from passage 60 to thereby supply lower chamber 32 with the volume of oil required to keep it fully charged.

During operation of the engine and due in part to the relative differences in size between the upper chamber 30 and the lower chamber 32 and also as an inherent part of the hydraulic system, pressure pulsations or surges will occur from the column of oil passing from the connecting rod 26 and through the cavity 46 to the upper chamber 30 and lower chamber 32. Such pulsations and surges tend to produce erratic relative movement of the inner member 12 and the outer member 14 and undesirable vibrations of the parts of the assembly. The elastic medial portion 106 of the slipper collector assembly 46 of the present invention expands and contracts when these fluid pulsations or surges are transmitted through the oil from the connecting rod 26 to the cavity 48. The elastic portion 106 expands upon pulsations or surges being produced and returns to its original shape or even contracts to the position illustrated in dashed lines in FIG. 3 to provide a counter force for offsetting the pulsations and thereby smoothing the flow of oil from the connecting rod 26 to the chambers 30 and 32. This, in combination with the coaxial connection between the cavity 48 and the upper chamber 30 through the inlet valve assembly 52 by reducing flow restriction for oil flowing into the larger upper chamber 30 upon relative expansion between the members 12 and 14 has been found to produce a more uniform and steady movement between the inner member 12 and outer member 14 contributing to a more efficient operation of the engine.

It is apparent that although I have described a single embodiment of my invention many changes can be made therein without departing from the spirit of the invention as expressed by the scope of the appended claims.

Having thus described my invention, I claim:

1. In an internal combustion engine, a piston having first and second members movable relative to one another in response to reciprocation of the piston with respect to the combustion chamber of the engine, and having a pressure fluid chamber within said piston which varies in internal volume in response to said relative movement and to variations in the quantity of pressure fluid therein, a combination therewith of:
 (a) means for supplying fluid to said chamber comprising a slipper collector assembly disposed within one of said members and having a portion slidingly sealingly engaging a portion of the connecting rod carrying said last-mentioned member, a passage provided in said connecting rod, a passage in said last mentioned member providing communication between said collector assembly and said first chamber and a one-way valve assembly carried in said last mentioned member intermediate said collector assembly and said chamber, and
 (b) said collector assembly including an elastic portion for contracting and expanding upon pulsations being produced in the fluid supplied to said chamber to thereby smooth the flow of said fluid.

2. The combination as defined in claim 1 and in which said slipper collector assembly is carried in a cavity formed in said last-mentioned member about the axis of said piston, and said passage and inlet check valve assembly are disposed coaxially with respect to said cavity.

3. The combination as defined in claim 1 and in which said slipper collector assembly further comprises upper and lower rigid ring members supporting said elastic portion, and a spring member carried intermediate said ring members and urging one of said ring members against a seat portion formed in said first-mentioned member and the other of said ring members into sealing, sliding engagement with said connecting rod.

4. The combination as defined in claim 1 and in which said collector assembly further comprises a first ring member and a second ring member carried in a cavity in said last mentioned member with one of said ring members having a lower edge engaging said connecting rod, said elastic portion comprising an elastic, substantially cylindrical member connected to said ring members and intermediate same, and spring means encompassing said elastic cylindrical member and engaging said ring members to urge said lower edge into said connecting rod engaging position.

5. In a variable combustion compression ratio piston for an internal combustion engine, an inner and an outer member movable relative to one another to vary the compression ratio of the engine, a control system for regulating movement of said members, comprising;
 (a) means defining a first chamber and a second chamber within said piston, said first and second chambers varying oppositely in volume and in response to said movement of said members,
 (b) means for supplying a pressure fluid to said first chamber and means discharging fluid from said first chamber upon a predetermined pressure increase in said first chamber,
 (c) said supply means comprising a slipper collector assembly disposed within said inner member and having a lower ring member slidingly sealingly engaging a portion of the connecting rod carrying said inner member, a passage provided in said connecting rod, a passage in said inner member providing communication between said collector assembly and said first chamber, said slipper collector assembly including an elastic portion operable to expand and contract in a direction substantially normal to the direction of fluid flow control through said collector assembly.

6. The combination as defined in claim 5 and in which said pressure and the axis of said slipper collector assembly are coaxial.

7. The combination as defined in claim 5 and in which said pressure fluid supplying means includes a one-way inlet valve assembly disposed in said passage intermediate said slipper collector assembly and said first chamber, said inlet valve assembly, said passage and said slipper collector assembly being disposed to produce substantially straight flow of said fluid from said slipper collector assembly to said first chamber.

8. In a variable compression ratio piston for an internal combustion engine having an inner member adapted for connection via a wrist pin to a connecting rod of the engine and an outer member carried on and movable axially relative to the inner member so that the crown of the outer member forms a variable boundary of the piston in the combustion chamber of the engine in which said piston reciprocates to thereby vary the clearance volume by movement of the crown relative to the wrist pin axis of the connecting rod, the combination therewith of a hydraulic system for said piston, said system comprising;
 (a) a first chamber defined between said crown and an adjacent first surface of said inner member and a second chamber defined between a second surface of said inner member and an adjacent surface of said outer member, said first and second chambers varying oppositely in volume in response to said movement of said outer member relative to said inner member and means remote from said piston for supplying pressure fluid from a source thereof to said first chamber, (b) said last mentioned means including a first passage means provided in said connecting rod, a slipper collector assembly carried within said inner member for collecting the oil discharged from said passage means, and valve means connecting said slipper collector assembly with said chambers, (c) said slipper collector assembly comprising a ring member axially slidably mounted within a cavity formed in said inner member, said ring member having a lower edge slidably engaging an upper portion of said connecting rod, elastic means secured to the upper edge of said ring member and expandable and contractable to restrict and expand the area of fluid flow through said collector assembly, and spring means urging said ring member into engagement with said connecting rod.

9. The combination as defined in claim 8 and in which said valve means includes a one-way inlet valve assembly connecting said slipper collector assembly with said first chamber and disposed with respect to said slipper collector assembly to produce substantially in-line flow through said inner member to said first chamber.

References Cited
UNITED STATES PATENTS

| | | | |
|---|---|---|---|
| 3,156,162 | 11/1964 | Wallace et al. | 123—48 |
| 3,161,112 | 12/1964 | Wallace et al. | |
| 3,185,137 | 5/1965 | Dreyer | 123—48 |
| 3,185,138 | 5/1965 | Druzynski | 123—48 |
| 3,303,831 | 2/1967 | Sherman. | |
| 3,311,096 | 3/1967 | Bachle et al. | |

WENDELL E. BURNS, *Primary Examiner.*

U.S. Cl. X.R.

123—48